United States Patent
Igarashi et al.

(10) Patent No.: US 7,476,844 B2
(45) Date of Patent: Jan. 13, 2009

(54) ENCODER AND DRIVING DEVICE INCORPORATING THE SAME

(75) Inventors: Hitoshi Igarashi, Nagano (JP); Hirotomo Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 230 days.

(21) Appl. No.: 11/485,453

(22) Filed: Jul. 13, 2006

(65) Prior Publication Data

US 2007/0013574 A1 Jan. 18, 2007

(30) Foreign Application Priority Data

Jul. 13, 2005 (JP) ............................ P2005-203924

(51) Int. Cl.
G01D 5/34 (2006.01)

(52) U.S. Cl. ................................. 250/231.13
(58) Field of Classification Search ............. 250/231.13
See application file for complete search history.

(56) References Cited

FOREIGN PATENT DOCUMENTS

JP        63-69323 A        3/1988

Primary Examiner—Seung C Sohn
(74) Attorney, Agent, or Firm—Sughrue Mion, PLLC

(57) ABSTRACT

An encoder is adapted to be opposed to a scale provided with a plurality of marks or slits arranged in a first direction such that a distance between centers of adjacent marks or slits in the first direction assumes a first length. Each of photo detectors has a light receiving region adapted to receive light emitted from a photo emitter and transmitted by way of the marks or slits, and is operable to output a detection signal in accordance with a quantity of the light received by the light receiving region. The photo detectors are arranged in a second direction perpendicular to the first direction while being shifted in the first direction by a second length which is one-sixteenth of the first length. Each of signal generators is operable to generate an output signal based on at least the detection signal outputted from one of the photo detectors. Each of exclusive-OR logic circuits is operable to perform a logical exclusive-OR calculation with respect to the output signals from two of the signal generators to generate an exclusive-OR signal. Some of the output signals and the exclusive-OR signals are output from the encoder. The level of the detection signal is changed in accordance with a relative movement between the marks or slits and the photo detectors, so as to have a first frequency. Each of the output signals has a second frequency which is double of the first frequency.

6 Claims, 6 Drawing Sheets

ENCODER AND DRIVING DEVICE INCORPORATING THE SAME

BACKGROUND OF THE INVENTION

The present invention relates to an encoder and a driving device incorporating the same.

Japanese Patent Publication No. 63-69323A discloses an encoder circuit which comprises $2^n$ detectors for detecting a mark provided on a moving plate for moving relatively and outputting signals having $2^n$ phases shifted from each other by $90/2^n$ degrees (n is an integer of 2 or more). The encoder circuit further comprises a resolution subdividing circuit to which the signals having the $2^n$ phases are inputted and a stage, in which the signals are output to a latter step from separate exclusive-OR circuits to which respective sets of outputs of a former step having phases shifted from each other by 90 degrees is inputted, is repeated by n-times.

In the case where the signals having the $2^n$ phases shifted from each other by $90/2^n$ degrees (n is an integer of 2 or more) which are output from the $2^n$ detectors are integrated by the exclusive-OR circuits in the n-stages as described the above, however, the signal output from a final stage of the exclusive-OR circuits has a frequency which is $2^n$-times as high as the signal output from the detector. As a result, the encoder circuit itself and a circuit such as a control board for receiving a signal output from the encoder circuit must be adapted to process such a high frequency signal, In addition, in the above encoder circuit, the signals having the $2^n$-phases shifted from each other by $90/2^n$ degrees (n is an integer of 2 or more) are generated one by one through $2^n$ separate detectors. For this reason, there is a possibility that the chronological order of the level change points of the output signals of the $2^n$ detectors might not be obtained in an assumed order because of relative precision in positions in which the detectors are to be provided. As a result, there is also a possibility that the chronological order of the level change points in the signals output through the n-stages of exclusive-OR circuits might not be obtained as assumed.

If the relationship between the positions in which two detectors having output signals synthesized through the exclusive-OR circuit are disposed is not relatively proper, for example, a difference in the phase between the output signals is deviated from 180 degrees so that a duty of the output signal is greatly deviated from 50%.

In the case where an encoder circuit is used for detecting the feeding amount of a medium in a printer, particularly, the medium feeding is PID (Proportional, Integral and Differential) controlled corresponding to a moving distance and a speed. Consequently, a frequency of a signal output from each of the detectors is greatly changed within a range from a low frequency at a low feeding speed to a high frequency at a high feeding speed. In order to shorten a time required for feeding the medium, moreover, it is required that a maximum feeding speed is to be increased as greatly as possible.

In the case where the detectors are provided separately as described in the above publication, there is also a possibility that the chronological order of the level change points of their output signals might be different from that obtained at a low frequency when the frequencies of the output signals are changed from "low" to "high" with an increase in the medium feeding speed. In other words, the chronological order of the level change points cannot be guaranteed between the output signals.

These problems become remarkable when a level change point for one output signal is increased to enhance a detecting resolution of a position or a speed so that the output signal has a frequency increased.

SUMMARY OF THE INVENTION

It is an object of the invention to obtain an encoder and a driving device which can cause a high resolution and a suppression in an increase in a frequency of an output signal to be compatible with each other while maintaining level change points of a plurality of output signals to have a desirable chronological order.

In order to achieve the above object, according to the invention, there is provided an encoder, adapted to be opposed to a scale provided with a plurality of marks or slits arranged in a first direction such that a distance between centers of adjacent marks or slits in the first direction assumes a first length, comprising:

a photo emitter, operable to emit light;

a plurality of photo detectors, each of which has a light receiving region adapted to receive the light emitted from the photo emitter and transmitted by way of the marks or slits, and is operable to output a detection signal in accordance with a quantity of the light received by the light receiving region, the photo detectors including a first photo detector, a second photo detector, a third photo detector and a fourth photo detector which are arranged in a second direction perpendicular to the first direction while being shifted in the first direction by a second length which is $[m+(\frac{1}{2}^{n+3})]$ of the first length;

a first signal generator, operable to generate a first signal based on at least the detection signal output from the first photo detector;

a second signal generator, operable to generate a second signal based on at least the detection signal output from the second photo detector;

a third signal generator, operable to generate a third signal based on at least the detection signal output from the third photo detector;

a fourth signal generator, operable to generate a fourth signal based on at least the detection signal output from the fourth photo detector;

a first exclusive-OR logic circuit, operable to perform a logical exclusive-OR calculation with respect to the first signal and the third signal to generate a first exclusive-OR signal;

a second exclusive-OR logic circuit, operable to perform a logical exclusive-OR calculation with respect to the second signal and the fourth signal to generate a second exclusive-OR signal;

a first output terminal, adapted to output one of the first signal, the second signal, a third signal and the fourth signal;

a second output terminal, adapted to output another one of the first signal, the second signal, a third signal and the fourth signal;

a third output terminal, adapted to output the first exclusive-OR signal; and a fourth output terminal, adapted to output the second exclusive-OR signal, wherein:

m is an integer no less than zero;

n is an integer no less than one;

the level of the detection signal is changed in accordance with a relative movement between the marks or slits and the photo detectors, so as to have a first frequency; and each of the first signal, the second signal, the third signal and the fourth signal has a second frequency which is $2^n$-times of the first frequency.

With this configuration, the encoder generates the first, second, third and fourth signals based on the detection signals of the photo detectors and outputs at least two of the signals from the terminals. The output signal has a frequency which is lower than that in the case where the detection signals of the photo detectors are divided into two output signals.

The photo detectors may be formed on a single board. The level change points of the at least two output signals are not influenced by a relative installation error of separate detectors as in the case where the photo detectors are provided by the separate detector units, respectively. Accordingly, the chronological order between the level change points of the at least two output signals is maintained in the same order as that in the case where the frequency of the output signal is low even if the frequency of the output signal is increased. It is possible to maintain the chronological order between the level change points of the at least two output signals.

Furthermore, the encoder generates and outputs the exclusive-OR signal of the first signal and the third signal and the exclusive-OR signal of the second signal and the fourth signal. The level change points of these signals are a double of the level change point of the first to fourth signals. As a result, it is possible to cause a high resolution and a suppression in an increase in a frequency of the output signal to be compatible with each other while maintaining the level change points of the output signals to have a desirable chronological order.

Each of the photo detectors may comprise at least one light receiving unit including four light receiving elements each of which has the light receiving region. The light receiving elements may be arranged in the first direction such that a distance between centers of adjacent light receiving regions assumes a third length which is one-fourth of the first length. Each of the first signal generator, the second signal generator, the third signal generator, the fourth signal generator may comprise:

a first circuit, operable to generate a first differential signal in accordance with a difference between a first pair of the four light receiving elements in which a distance between centers of the light receiving regions thereof assumes a fourth length which is a half of the first length;

a second circuit, operable to generate a second differential signal in accordance with a difference between a second pair of the four light receiving elements in which a distance between centers of the light receiving regions thereof assumes the fourth length; and an exclusive-OR logic circuit, operable to perform a logical exclusive-OR calculation with respect to the first differential signal and the second differential signal to generate one of the first signal, the second signal, the third signal and the fourth signal.

With this configuration, each change point of the first signal, each change point of the second signal, each change point of the third signal and/or each change point of the fourth signal correspond(s) to the level change point of the level signal of any of the photo detectors. Referring to the change point(s) of the first, second, third and/or fourth signal(s), accordingly, the photo detectors to be formed on the board are caused to correspond to a timing for actually detecting marks or slits to be arranged at a predetermined interval.

According to the invention, there is also provided a driving device, operable to move an object, comprising:

a scale provided with a plurality of marks or slits arranged in a first direction such that a distance between centers of adjacent marks or slits in the first direction assumes a first length;

an encoder, opposing the scale and comprising:

a photo emitter, operable to emit light;

a plurality of photo detectors, each of which has a light receiving region adapted to receive the light emitted from the photo emitter and transmitted by way of the marks or slits, and is operable to output a detection signal in accordance with a quantity of the light received by the light receiving region, the photo detectors including a first photo detector, a second photo detector, a third photo detector and a fourth photo detector which are arranged in a second direction perpendicular to the first direction while being shifted in the first direction by a second length which is $[m+(\frac{1}{2}^{n+3})]$ of the first length;

a first signal generator, operable to generate a first signal based on at least the detection signal output from the first photo detector;

a second signal generator, operable to generate a second signal based on at least the detection signal output from the second photo detector;

a third signal generator, operable to generate a third signal based on at least the detection signal output from the third photo detector;

a fourth signal generator, operable to generate a fourth signal based on at least the detection signal output from the fourth photo detector;

a first exclusive-OR logic circuit, operable to perform a logical exclusive-OR calculation with respect to the first signal and the third signal to generate a first exclusive-OR signal;

a second exclusive-OR logic circuit, operable to perform a logical exclusive-OR calculation with respect to the second signal and the fourth signal to generate a second exclusive-OR signal;

a first output terminal, adapted to output one of the first signal, the second signal, a third signal and the fourth signal;

a second output terminal, adapted to output another one of the first signal, the second signal, a third signal and the fourth signal;

a third output terminal, adapted to output the first exclusive-OR signal; and a fourth output terminal, adapted to output the second exclusive-OR signal, wherein:

m is an integer no less than zero;

n is an integer no less than one;

the level of the detection signal is changed in accordance with a relative movement between the marks or slits and the photo detectors, so as to have a first frequency; and each of the first signal, the second signal, the third signal and the fourth signal has a second frequency which is $2^n$-times of the first frequency.

With this configuration, in the case where the interval between the marks or the slits formed on the scale is set to be 1, it is possible to detect and control the movement of the object every position which is at least one-Xth (X is a predetermined number).

According to the invention, there is also provided an encoder, adapted to be opposed to a scale provided with a plurality of marks or slits arranged in a first direction such that a distance between centers of adjacent marks or slits in the first direction assumes a first length, comprising:

a photo emitter, operable to emit light;

a plurality of photo detectors, each of which has a light receiving region adapted to receive the light emitted from the photo emitter and transmitted by way of the marks or slits, and is operable to output a detection signal in accordance with a quantity of the light received by the light receiving region, the photo detectors including a first photo detector, a second photo detector, a third photo detector and a fourth photo detector which are arranged in a second direction perpendicular to the first direction while being shifted in the first direction;

a first signal generator, operable to generate a first signal based on at least the detection signal output from the first photo detector;

a second signal generator, operable to generate a second signal based on at least the detection signal output from the second photo detector;

a third signal generator, operable to generate a third signal based on at least the detection signal output from the third photo detector;

a fourth signal generator, operable to generate a fourth signal based on at least the detection signal output from the fourth photo detector;

a first exclusive-OR logic circuit, operable to perform a logical exclusive-OR calculation with respect to the first signal and the third signal to generate a first exclusive-OR signal;

a second exclusive-OR logic circuit, operable to perform a logical exclusive-OR calculation with respect to the second signal and the fourth signal to generate a second exclusive-OR signal;

a first output terminal, adapted to output one of the first signal, the second signal, a third signal and the fourth signal;

a second output terminal, adapted to output another one of the first signal, the second signal, a third signal and the fourth signal;

a third output terminal, adapted to output the first exclusive-OR signal; and a fourth output terminal, adapted to output the second exclusive-OR signal, wherein:

m is an integer no less than zero;

the level of the detection signal is changed in accordance with a relative movement between the marks or slits and the photo detectors, so as to have a first frequency; and each of the first signal, the second signal, the third signal and the fourth signal has a second frequency which is double of the first frequency.

Each of the photo detectors may comprise at least one light receiving unit including four light receiving elements each of which has the light receiving region. The light receiving elements may be arranged in the first direction such that a distance between centers of adjacent light receiving regions assumes a second length which is one-fourth of the first length. Each of the first signal generator, the second signal generator, the third signal generator, the fourth signal generator may comprise:

a first circuit, operable to generate a first differential signal in accordance with a difference between a first pair of the four light receiving elements in which a distance between centers of the light receiving regions thereof assumes a third length which is a half of the first length;

a second circuit, operable to generate a second differential signal in accordance with a difference between a second pair of the four light receiving elements in which a distance between centers of the light receiving regions thereof assumes the fourth length; and an exclusive-OR logic circuit, operable to perform a logical exclusive-OR calculation with respect to the first differential signal and the second differential signal to generate one of the first signal, the second signal, the third signal and the fourth signal.

According to the invention, there is also provided a driving device, operable to move an object, comprising:

a scale provided with a plurality of marks or slits arranged in a first direction such that a distance between centers of adjacent marks or slits in the first direction assumes a first length;

an encoder, opposing the scale and comprising:

a photo emitter, operable to emit light;

a plurality of photo detectors, each of which has a light receiving region adapted to receive the light emitted from the photo emitter and transmitted by way of the marks or slits, and is operable to output a detection signal in accordance with a quantity of the light received by the light receiving region, the photo detectors including a first photo detector, a second photo detector, a third photo detector and a fourth photo detector which are arranged in a second direction perpendicular to the first direction while being shifted in the first direction;

a first signal generator, operable to generate a first signal based on at least the detection signal output from the first photo detector;

a second signal generator, operable to generate a second signal based on at least the detection signal output from the second photo detector;

a third signal generator, operable to generate a third signal based on at least the detection signal output from the third photo detector;

a fourth signal generator, operable to generate a fourth signal based on at least the detection signal output from the fourth photo detector;

a first exclusive-OR logic circuit, operable to perform a logical exclusive-OR calculation with respect to the first signal and the third signal to generate a first exclusive-OR signal;

a second exclusive-OR logic circuit, operable to perform a logical exclusive-OR calculation with respect to the second signal and the fourth signal to generate a second exclusive-OR signal;

a first output terminal, adapted to output one of the first signal, the second signal, a third signal and the fourth signal;

a second output terminal, adapted to output another one of the first signal, the second signal, a third signal and the fourth signal;

a third output terminal, adapted to output the first exclusive-OR signal; and a fourth output terminal, adapted to output the second exclusive-OR signal, wherein:

m is an integer no less than zero;

the level of the detection signal is changed in accordance with a relative movement between the marks or slits and the photo detectors, so as to have a first frequency; and each of the first signal, the second signal, the third signal and the fourth signal has a second frequency which is double of the first frequency.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Embodiments of the invention will be described below in detail with reference to the accompanying drawings. Description will be given to a driving device provided with an encoder incorporated in a printer as an example.

Figure 1:
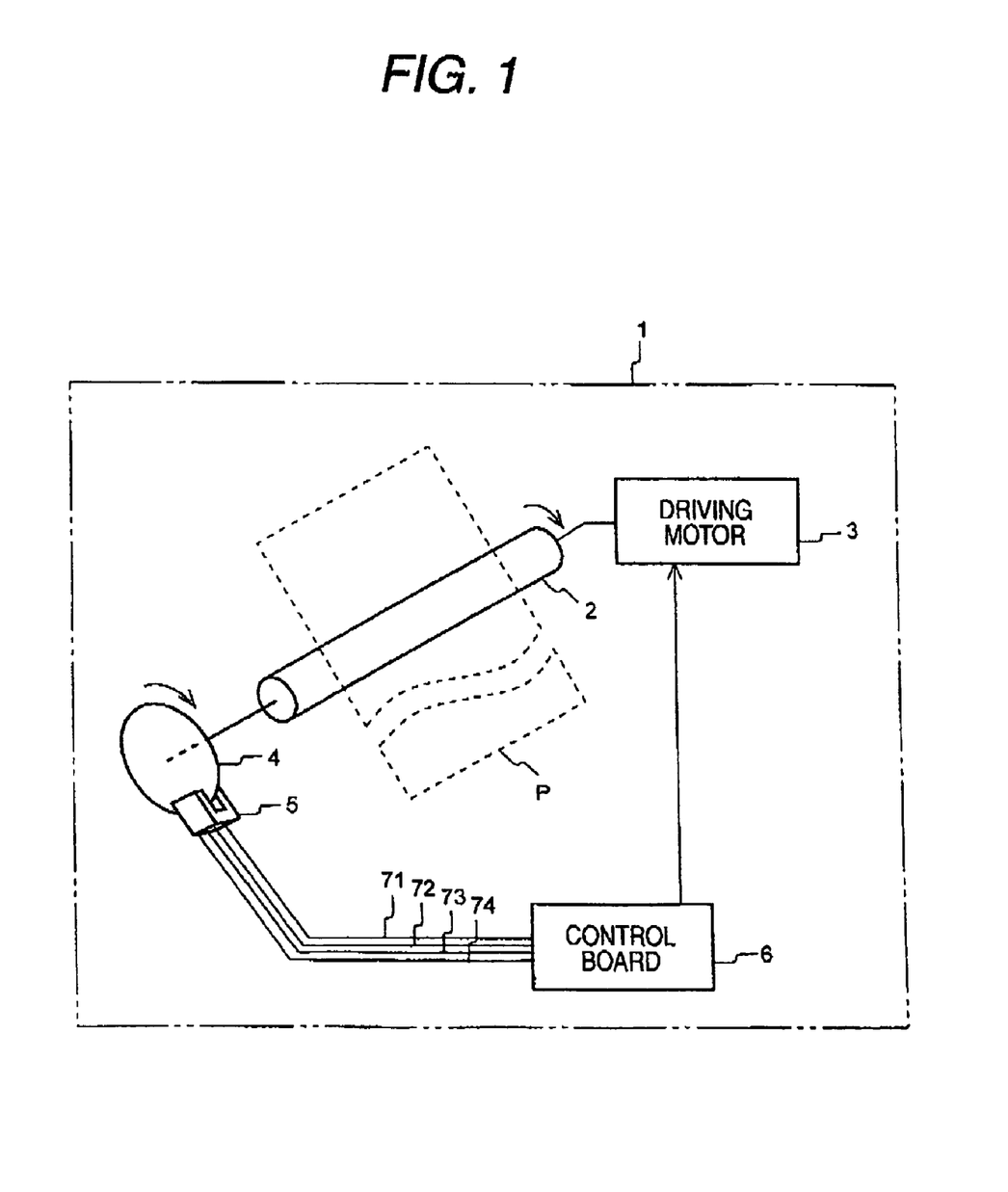
FIG. 1 is a schematic view showing a driving device provided with an encoder and incorporated in a printer, according to one embodiment of the invention.

As shown in FIG. 1, a printer 1 comprises a medium transporting roller 2 to be a controlled object. The medium transporting roller 2 is obtained by forming an elastic member such as rubber to take an almost cylindrical shape, for example.

A driving motor 3 and a scale 4 are connected to the medium transporting roller 2.

The driving motor 3 includes a stepping motor and a DC (Direct Current) motor, for example. The driving motor 3 serves to rotate and drive the medium transporting roller 2 in accordance with a control signal. A rotating and driving force of the driving motor 3 may be transmitted to the medium transporting roller 2 through a transmitting mechanism constituted by gears.

Figure 2:
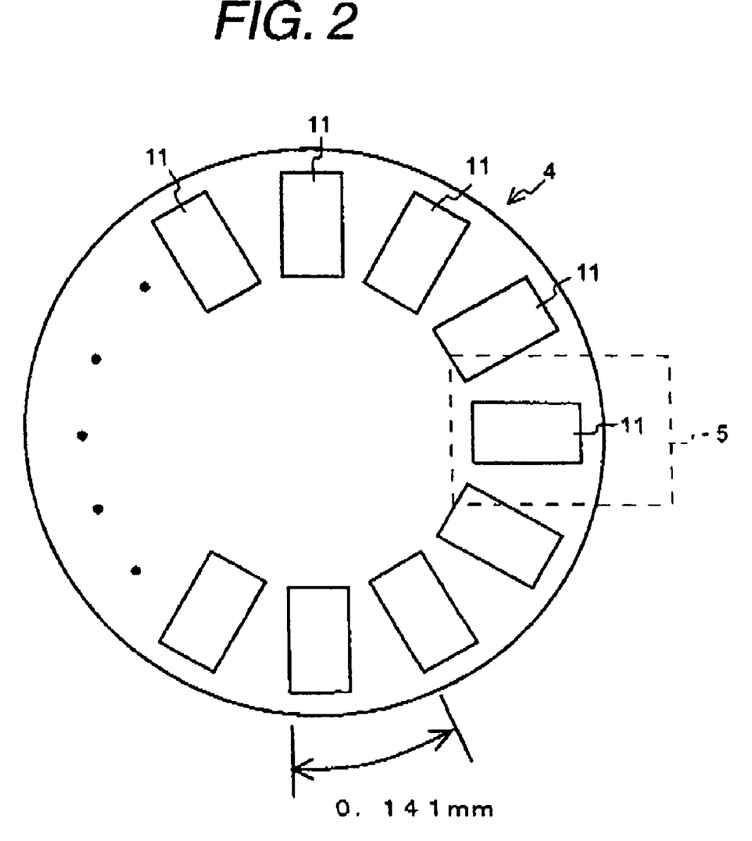
FIG. 2 is a front view of a scale in the driving device.

As shown in FIG. 2, the scale 4 is obtained by forming a plate made of stainless to take a shape of a disc, for example. The scale 4 has 180 slits 11. The 180 slits 11 are circularly arranged at an isometric interval along the outer periphery of the scale 4. An interval between two adjacent slits 11 is almost equal to a width of the slit 11 in the circumferential direction of the scale 4. In other words, the width of the slit 11 is approximately 50% of an interval between opposing edges of adjacent slits 11.

The scale 4 is integrated with the medium transporting roller 2 and is rotated together with the medium transporting roller 2. When the medium transporting roller 2 makes a rotation, the scale 4 also makes a rotation. When a circumferential length of the medium transporting roller 2 is 1 inch, the single scale 4 has a resolution of 180 (=1 inch/180 pieces) dpi. The scale 4 may be connected to the medium transporting roller 2 through a transmitting mechanism constituted by a gear in such a manner that the scale 4 makes two rotations when the medium transporting roller 2 makes a rotation, for example. By integrating the scale 4 with the medium transporting roller 2, it is possible to cause the amount of the rotation of the scale 4 and that of the medium transporting roller 2 to accurately have a one-to-one correspondence without including an error made by a play of an engagement of the gears in the transmitting mechanism.

Figure 3:
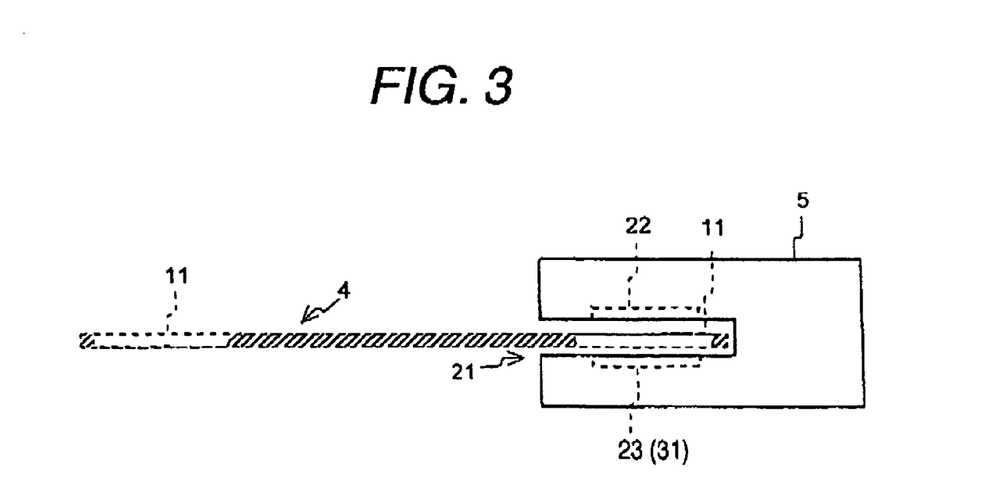
FIG. 3 is a schematic side view of the encoder.

As shown in FIG. 3, the encoder 5 has a box-shaped housing formed with a concave portion 21 on one side face thereof. In the concave portion 21, a photo emitter 22 is provided on one of two faces opposed to each other and a board 23 is provided on the other face. A plurality of photo detectors 31 are formed on the board 23. The encoder 5 is positioned with respect to the scale 4 in order to partially interpose an outer peripheral part of the scale 4 in the concave portion 21. Consequently, the outer peripheral part of the scale 4, that is, a portion in which the slit 11 of the scale 4 is to be formed is positioned between the photo emitter 22 and the photo detectors 31.

The photo emitter 22 is a light emitting diode, for example. The light emitting diode serves to emit a light having an excellent straightness.

Figure 4:
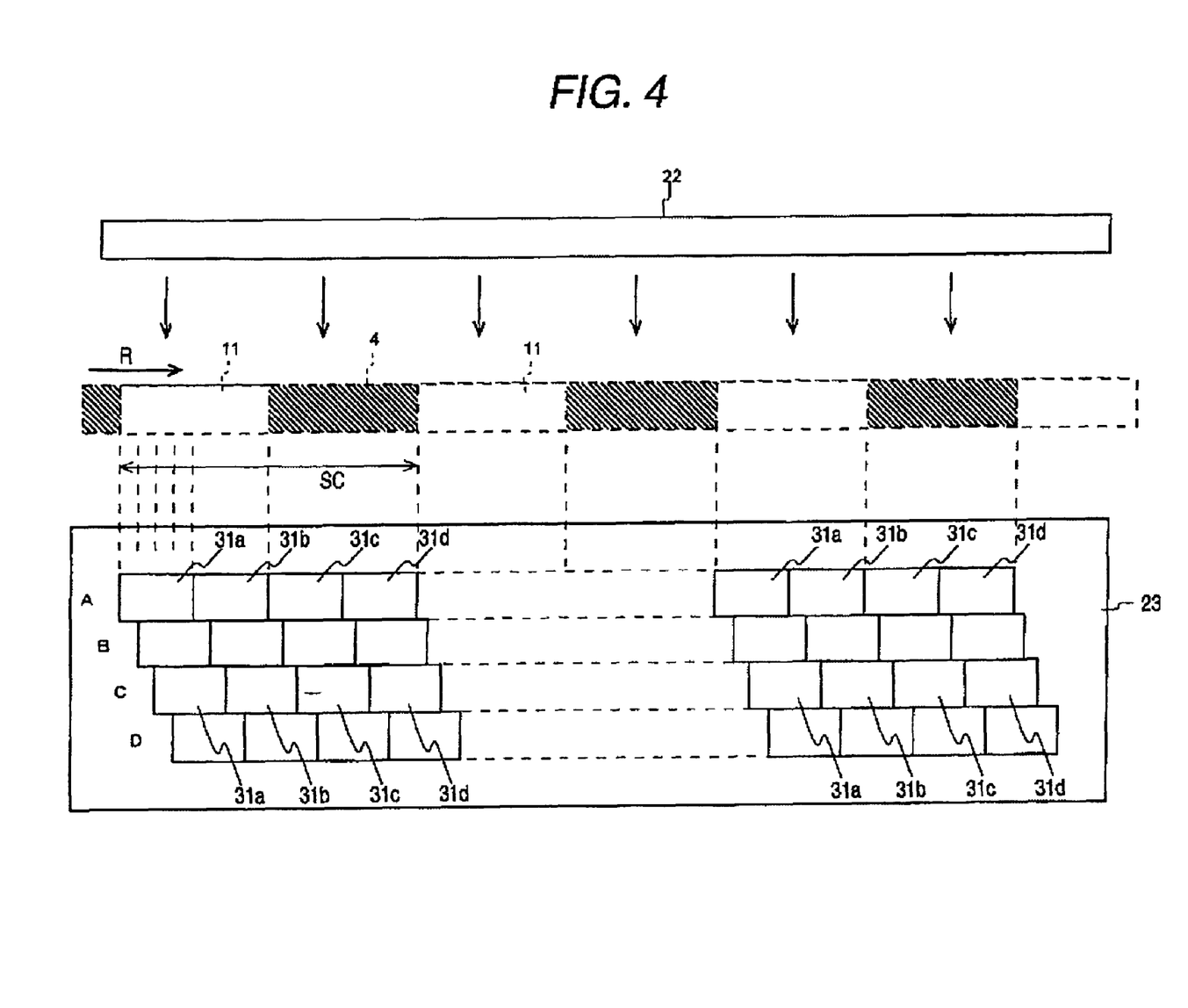
FIG. 4 is a schematic view showing a photo emitter and photo detectors on a board in the encoder.

As shown in FIG. 4, the photo detectors 31 (31a, 31b, 31c, 31d) are arranged on the board 21 so as to form four arrays A, B, C, D each of which extends in a direction parallel to a rotating direction R of the scale 4. The photo detectors 31 are photodiodes, for example. The photodiode outputs a signal having a level corresponding to the amount of received light.

Assuming that a light emitted from the photo emitter 22 is irradiated as a parallel light onto the board 23, a shade is formed on the board 23 in the same cycle as a cycle of formation of the slit 11 in the outer peripheral part of the scale 4. In the board 23, the light of the photo emitter 22 is irradiated on a portion to which the slit 11 corresponds. The light of the photo emitter 22 is shielded by the scale 4 and is not irradiated on a portion to which a portion between the slits 11 of the scale 4 corresponds. The cycle of the shade in the board 23 is a spatial cycle SC in the board 23 corresponding to an interval at which the slits 11 are provided.

In the case where the light emitted from the photo emitter 22 cannot be regarded as the parallel light, that is, the same light is a diffused light, the cycle of the shade formed on the board 23 is small in the closest portion to the photo emitter 22 in the board 23 and is increased more greatly apart from the photo emitter 22. Accordingly, the spatial cycle is not constant in the board 23.

A plurality of photo detectors 31 in each array is formed over a plurality of spatial cycles in the board 23. Each of the photo detectors 31 includes a light receiving face having a size which is a quarter of the spatial cycle.

Moreover, each one of the four arrays A, B, C, D is formed so as to shift from an adjacent array in the rotating direction R of the scale, by one-16th of the spatial cycle SC. Specifically, the photo detectors 31 the array B is formed in a position shifted by one-16th of one spatial cycle SC toward the right side of the photo detectors 31 in the array A. The photo detectors 31 in the array C is formed in a position shifted by two-16th of one spatial cycle SC toward the right side of the photo detectors 31 in the array A. The photo detectors 31 in the array D is formed in a position shifted by three-16th of one spatial cycle SC toward the right side of the photo detectors 31 in the array A.

More specifically, in FIG. 4, the photo detector 31a on a left end in the array A, the photo detector 31a on a left end in the array B, the photo detector 31a on a left end in the array C and the photo detector 31a on a left end in the array D are arranged in order in an amount of a shift by one-16th of one spatial cycle SC in a direction of a movement of the shades formed by the slits (the direction R).

Figure 5:
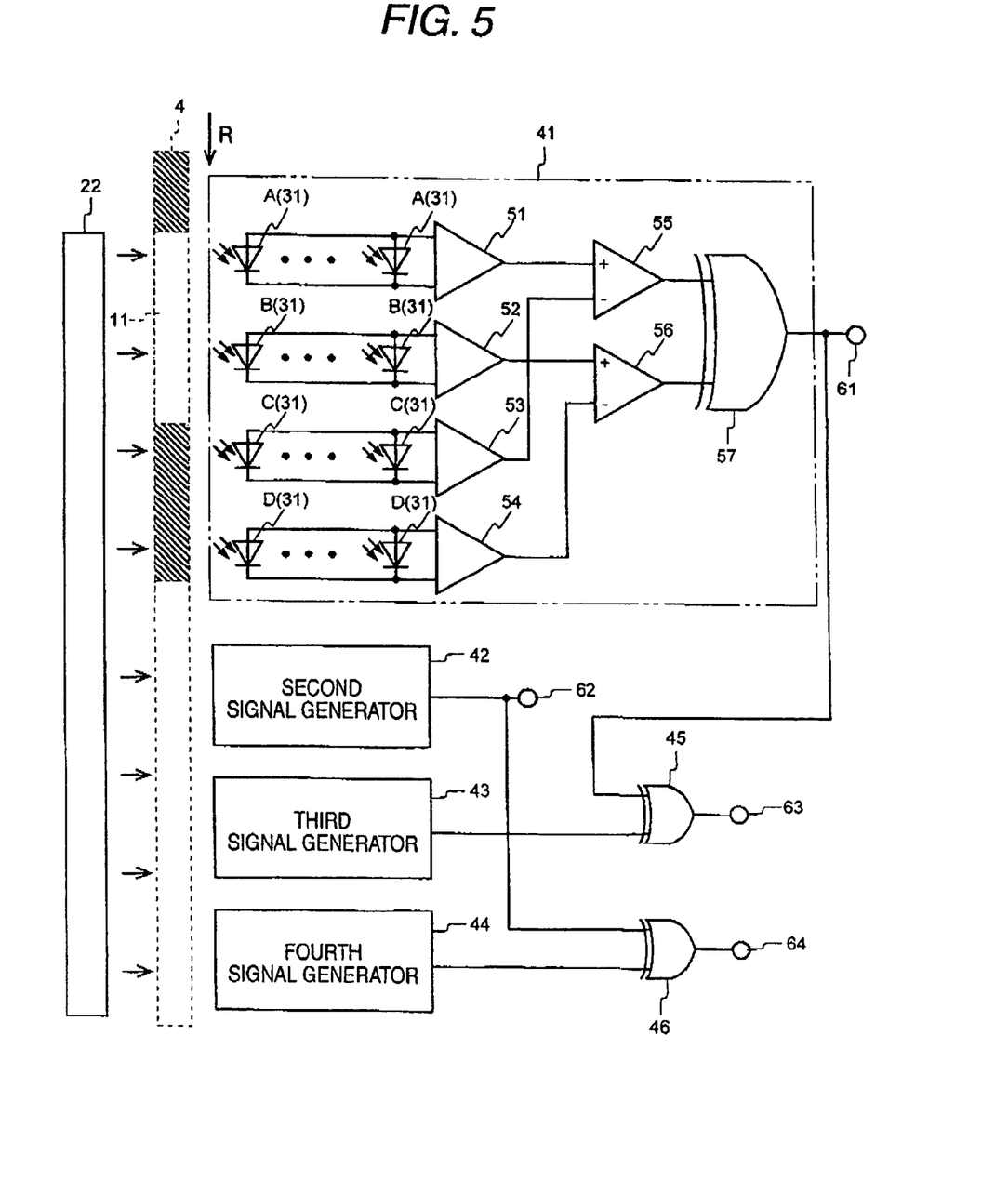
FIG. 5 is a diagram showing a circuit configuration of the encoder.

As shown in FIG. 5, the encoder 5 includes: a first signal generator 41 having a plurality of photo detectors 31 in the array A; a second signal generator 42 having a plurality of photo detectors 31 in the array B; a third signal generator 43 to be second output signal generating means having a plurality of photo detectors 31 in the array C; a fourth signal generator 44 having a plurality of photo detectors 31 in the array D; a first output exclusive-OR circuit 45; and a second output exclusive-OR circuit 46.

The first signal generator 41 has a plurality of photo detectors 31 in the array A, four first to fourth amplifiers 51, 52, 53 and 54, a first differential signal generator 55, a second differential signal generator 56, and an exclusive OR circuit 57.

In the case where the photo detectors 31 in the A array are set to be a first photo detector 31a, a second photo detector 31b, a third photo detector 31c and a fourth photo detector 31d from a left side every spatial cycle SC as shown in FIG. 4. The first photo detectors 31a are connected to the first amplifier 51. Each of the first photo detectors 31a outputs a level signal corresponding to the amount of the received light. The first amplifier 51 amplifies the level signal.

Similarly, the second photo detectors 31b are connected to the second amplifier 52. The second amplifier 52 amplifies and outputs level signals output from the second photo detectors 31b. The third photo detectors 31c are connected to the third amplifier 53. The third amplifier 53 amplifies and outputs level signals output from the third photo detectors 31c. The fourth photo detectors 31d are connected to the fourth amplifier 54. The fourth amplifier 54 amplifies and outputs level signals output from the fourth photo detectors 31d.

The first amplifier 51 and the third amplifier 53 output the amplified level signals to the first differential signal generator 55. The level signal amplified by the first amplifier 51 is input to a non-inverting input terminal of the first differential signal generator 55. The level signal amplified by the third amplifier 53 is input to an inverting input terminal of the first differential signal generator 55.

The first differential signal generator 55 outputs a high level when a level of the signal input to the non-inverting input terminal is higher than that of the signal input to the inverting input terminal, and outputs a low level when the level of the signal input to the non-inverting input terminal is lower than that of the signal input to the inverting input terminal. The first differential signal generator 55 outputs a signal having a digital waveform.

The second amplifier 52 and the fourth amplifier 54 output the amplified level signals to the second differential signal generator 56. The level signal amplified by the second amplifier 52 is input to a non-inverting input terminal of the second differential signal generator 56. The level signal amplified by the fourth amplifier 54 is input to an inverting input terminal of the second differential signal generator 56.

The second differential signal generator 56 outputs a high level when a level of the signal input to the non-inverting input terminal is higher than that of the signal input to the inverting input terminal, and outputs a low level when the level of the signal input to the non-inverting input terminal is lower than that of the signal input to the inverting input terminal. The second differential signal generator 56 outputs a signal having a digital waveform.

The signal output from the first differential signal generator 55 and the signal output from the second differential signal generator 56 are input to the exclusive OR circuit 57. The exclusive OR circuit 57 outputs the low level when both of the two inputs have the high level or the low level, and outputs the high level when only one of them has the high level. A signal output from the exclusive OR circuit 57 corresponds to a first signal.

The internal structures of the second signal generator 42, the third signal generator 43 and the fourth signal generator 44 are the same as the internal structure of the first signal generator 41, and they are neither illustrated nor described.

The first signal output from the first signal generator 41 and a third signal output from the third signal generator 43 are input to the first output exclusive-OR circuit 45. The first output exclusive-OR circuit 45 generates, as a first exclusive-OR signal, a signal to be an exclusive-OR of the first signal and the third signal.

A second signal output from the second signal generator 42 and a fourth signal output from the fourth signal generator 44 are input to the second output exclusive-OR circuit 46. The second output exclusive-OR circuit 46 generates, as a second exclusive-OR signal, a signal to be an exclusive-OR of the second signal and the fourth signal.

The encoder 5 has four output terminals 61, 62, 63 and 64. The output terminal 61 outputs the first signal generated by the first signal generator 41. The output terminal 62 outputs the second signal generated by the second signal generator 42. The output terminal 63 outputs the first exclusive-OR signal generated by the first output exclusive-OR circuit 45. The output terminal 64 outputs the second exclusive-OR signal generated by the second output exclusive-OR circuit 46.

The encoder 5 has four output terminals 61, 62, 63 and 64 connected to a control board 6 through four signal lines 71, 72, 73 and 74 (see FIG. 1). The control board 6 has a central processing unit (CPU), a random access memory (RAM), a storage device, an input/output port, and a system bus for connecting them which are not shown. The four signal lines 71, 72, 73 and 74 are connected to the input/output port. In the control board 6, the central processing unit reads, into the RAM, a medium feeding control program (not shown) stored in the storage device and executes the same program. The control board 6 generates a control signal based on signals input from the four signal lines 71, 72, 73 and 74. The control board 6 outputs the generated control signal to the driving motor 3. The control board 6 carries out a PID control over an amount of a rotation and a rotating speed of the medium transporting roller 2 through the driving motor 3, for example.

Next, description will be given to a medium feeding control operation of the printer 1.

When an instruction for a medium feeding is given from a controller of the printer 1 which is not shown, the control board 6 generates a control signal and outputs the same control signal to the driving motor 3. The driving motor 3 starts the rotating and driving operation of the medium transporting roller 2 in accordance with the control signal. When the medium transporting roller 2 is rotated, a medium P is delivered by the medium transporting roller 2.

Moreover, the scale 4 is rotated together with the medium transporting roller 2. When the scale 4 is rotated, the slit 11 is moved between the photo emitter 22 and the photo detectors 31 in the encoder 5. The photo detector 31 outputs a signal having a level in accordance with the amount of the received light. The photo detector 31 outputs a high level when the slit 11 opposes, and outputs a low level when the part of the scale 4 between the slits 11 opposes. The photo detector 31 outputs a level signal which is changed in a cycle corresponding to a moving speed of the scale 4.

Figure 6A:
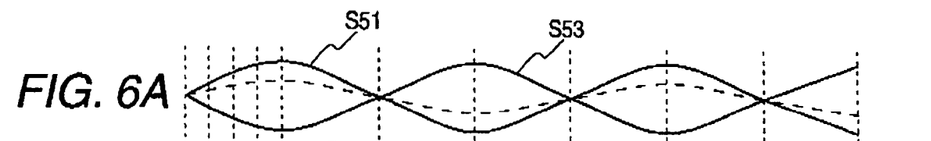
FIGS. 6A to 6J are time charts showing signals derived at respective parts of the encoder circuit.

FIG. 6A shows waveforms of the level signals output and amplified by the first amplifier 51 and the third amplifier 53 (denoted as S51 and S53).

Since the first photo detector 31a and the third photo detector 31c are formed on the board 23 with a shift corresponding to a half of one spatial cycle SC, the waveform S51 and S53 are shifted from each other by a cycle which is a half of one spatial cycle SC.

Figure 6B:
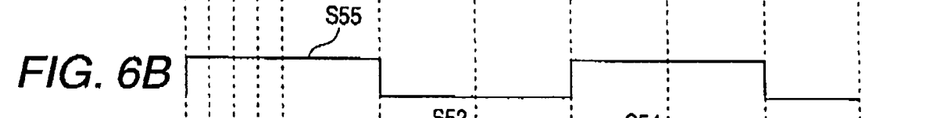

FIG. 6B shows an output signal waveform of the first differential signal generator 55 (denoted as S55). The signal output from the first amplifier 51 and the signal output from the third amplifier 53 are input to the first differential signal generator 55. The first differential signal generator 55 outputs a high level when the signal output from the first amplifier 51 is higher than the signal output from the third amplifier 53, and outputs a low level when the signal output from the first amplifier 51 is lower than the signal output from the third amplifier 53. The signal output S55 from the first differential signal generator 55 has a cycle which is almost equal to the cycle of the level signal output from the first photo detector 31a and has a waveform in a duty of approximately 50%.

Figure 6C:
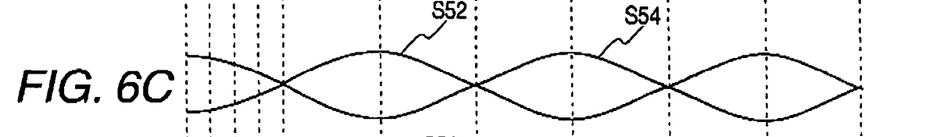
Figure 6D:
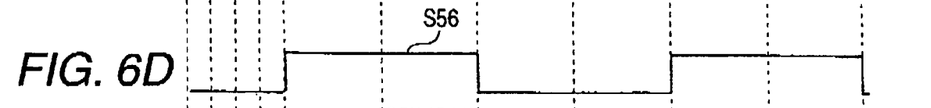

FIG. 6C shows waveforms of the level signals output and amplified by the second amplifier 52 and the fourth amplifier 54 (denoted as S52 and S54). FIG. 6D shows a waveform of the signal output from the second differential signal generator 56 (denoted as S56). The signal S56 output from the second differential signal generator 56 has a cycle which is almost the same as that of the level signal output from the second photo detector 31b and has a waveform changed digitally in a duty of approximately 50%.

Since the first photo detector 31a and the second photo detector 31b are formed on the board 23 with a shift corresponding to a quarter of one spatial cycle SC, the signal S55 output from the first differential signal generator 55 and the signal S56 output from the second differential signal generator 56 are shifted from each other by a cycle of a quarter of one spatial cycle SC.

Figures 6E, 6F, 6G, 6H, 6I, 6J:
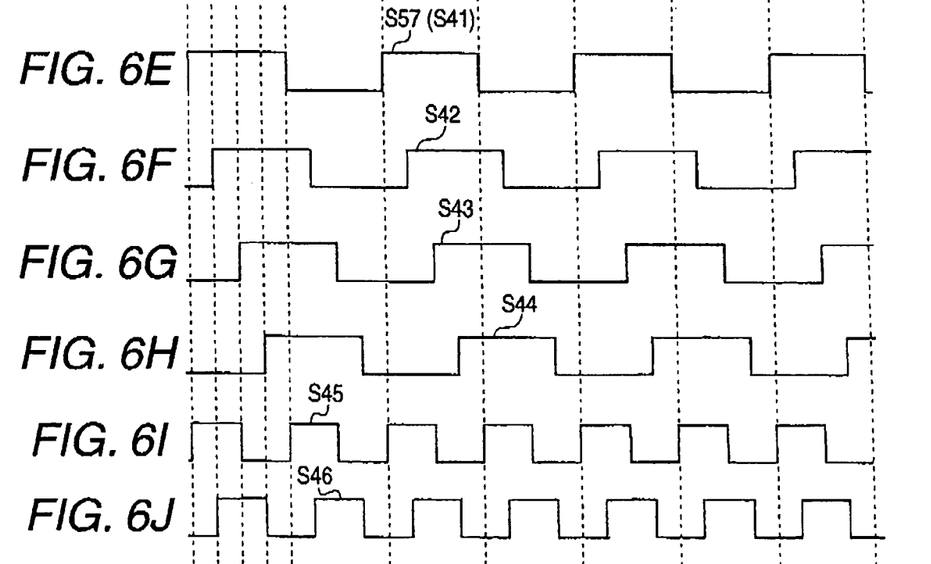

FIG. 6E shows a waveform of the first signal output from the exclusive OR circuit 57 (denoted as S57). The exclusive OR circuit 57 outputs the high level when only the signal S55 output from the first differential signal generator 55 or only the signal S56 output from the second differential signal generator 56 has the high level, and outputs the low level in the other cases. The waveform of the signal S57 output from the exclusive OR circuit 57 has a cycle which is almost a half of the cycle of the level signal of the photo detector 31.

FIG. 6F shows a waveform of the second signal output from the second signal generator 42 (denoted as S42). FIG. 6G shows a waveform of the third signal output from the third signal generator 43 (denoted as S43). FIG. 6H shows a waveform of the fourth signal output from the fourth signal generator 44 (denoted as S44). These output signals also have cycles which are almost a half of the cycle of the level signal of the photo detector 31.

As described the above, the photo detector 31 in the array B is formed with a shift by one-16th of one spatial cycle toward a right side of the photo detector 31 in the array A. The photo detector 31 in the array C is formed with a shift by two-16th of one spatial cycle toward the right side of the photo detector 31 in the array A. The photo detector 31 in the array D is formed with a shift by three-16th of one spatial cycle toward the right side of the photo detector 31 in the array A.

As shown in FIGS. 6E to 6H, accordingly, a phase of the second signal S42 output from the second signal generator 42 is basically delayed in a time of one-16th of one spatial cycle from a phase of the first signal S41 output from the first signal generator 41. A phase of the third signal S43 output from the third signal generator 43 is basically delayed in a time of two-16th of one spatial cycle from the phase of the first signal S41 output from the first signal generator 41. A phase of the fourth signal S44 output from the fourth signal generator 44 is basically delayed in a time of three-16th of one spatial cycle from the phase of the first signal S41 output from the first signal generator 41.

FIG. 6I shows a signal waveform of the first exclusive-OR signal output S45 from the first output exclusive-OR circuit 45. The first exclusive-OR signal 45 has a cycle which is an almost half of the cycle of the first signal S41. FIG. 6J shows a signal waveform of the second exclusive-OR signal S46 output from the second output exclusive-OR circuit 46. The second exclusive-OR signal S46 has a cycle which is an almost half of the cycle of the second signal S42. Moreover, the second signal S42 is delayed by a time of one-16th of one spatial cycle SC from the first signal S41 as described above. Accordingly, the second exclusive-OR signal S46 is also delayed by a time of one-16th of one spatial cycle SC from the first exclusive-OR signal S45.

The four signals including the first signal S41 shown in FIG. 6E, the second signal S42 shown in FIG. 6F, the first exclusive-OR signal S45 shown in FIG. 6I and the second exclusive-OR signal S46 shown in FIG. 6J are output from the four output terminals 61, 62, 63 and 64 of the encoder 5 to the control board 6 through the signal lines 71, 72, 73 and 74 as shown in FIG. 1.

The control board 6 changes a control signal to be output to the driving motor 3 based on the number of level change points of the signal output from the signal generator in each array which is to be input, thereby carrying out the PID control over the rotation of the medium transporting roller 2.

In a case where the rotating speed of the medium transporting roller 2 is relatively low, the control board 6 recognizes the amount of the rotation of the medium transporting roller 2 based on the total number of the level change points of the two exclusive-OR signals S45 and S46 shown in FIGS. 6I and 6J from a reference timing of a control start, thereby carrying out the PID control over the amount of the rotation of the medium transporting roller 2.

In a case where the rotating speed of the medium transporting roller 2 is relatively high, the control board 6 recognizes the amount of the rotation of the medium transporting roller 2 based on the total number of the level change points of the two signals shown in, e.g., FIGS. 6E and 6F from a reference timing of a control start, thereby carrying out the PID control over the amount of the rotation of the medium transporting roller 2.

In this embodiment, the encoder 5 outputs four signals (the first to fourth signals) from the level signals output from the photo detectors 31 arranged in four arrays on one board 23. Each of the output signals S41, S42, S43, S44 corresponding to one of the arrays A, B, C, D is generated from the waveforms of the level signals of the four photo detectors 31a, 31b, 31c, 31d arranged on the board with the interval corresponding to a quarter of one spatial cycle SC. The encoder 5 outputs two of the four signals.

Accordingly, each of two signals selected from the first to fourth signals has a frequency which is a double of the frequency of the level signal and all of the level change points correspond to the level change point of the level signal of the photo detector 31. By the two output signals, the encoder 5 can obtain resolutions for a position and a speed which are 8 times as high as the resolution of the slit 11 to be formed in the scale 4. The encoder 5 may output at least three of the first to fourth signals.

In addition, the encoder 5 outputs an exclusive-OR signal of the first and third signals and an exclusive-OR signal of the second and fourth signals. The level change points of these exclusive-OR signals are a double of the level change point of the first signal. The encoder 5 can obtain resolutions for a position and a speed which is 16 times as high as the resolution of the slit 11 formed in the scale 4 by the two output signals.

As a result, it is possible to obtain a resolution for a position or a speed which is eight times as high as a conventional resolution while using the scale 4 having the same size and precision as that in the conventional art and to obtain a resolution for a position or a speed which is equivalent to that in the conventional art by using the scale 4 having a smaller size as that in the conventional art. It is possible to obtain a considerably higher resolution than that in the conventional art with precision in a gap between the photo emitter 22 and the photo detector 31 in the encoder 5 or precision in a position of the scale 4 in the gap which is almost equivalent to precision in the conventional encoder.

Although a detecting resolution for a position or a speed which is obtained by the four output signals is set to be 16 times as high as that in the conventional encoder, moreover, the frequencies of the four signals output from the encoder 5 are reduced to have a double cycle of the level signal output from the photo detector 31. Furthermore, a duty is also approximately 50% so that a high frequency component generated in the case where the duty is deviated from 50% is suppressed.

Accordingly, it is possible to cause a high resolution and a suppression in an increase in a frequency of the output signal to be compatible with each other while maintaining the level change points of the output signals to have a desirable chronological order. Accordingly, the encoder 5 can output a signal having a desirable waveform without considerably improving a high frequency characteristic thereof. Even if the medium feeding speed in the printer 1 is increased so that the frequency of the signal output from the encoder 5 is increased, moreover, the control board 6 can properly determine the position and rotating speed of the scale 4 based on the two signals selected from the first to fourth signals, thereby executing the PID control. Even if a waveform dullness is caused by the signal lines (transmission paths) 71, 72, 73 and 74 provided between the control board 6 and the encoder 5 and a noise filter circuit which is not shown, the control board 6 can properly recognize the position of the scale 4 without the influence of the waveform dullness based on the two signals. The control board 6 can recognize an feeding amount and a feeding speed of the medium P to control the medium feeding in the resolution obtained by the two exclusive-OR signals output from the encoder 5.

Since the photo detectors 31 are arranged on one board 23 so as to form the four arrays A, B, C, D, a chronological order of the change points of the level signals of the photo detectors 31 (i.e., a chronological order of the level change points of the four output signals) is along with a predetermined order (e.g., an order of the arrays A, B, C, D, A, B, . . . ).

Even if the medium feeding speed is increased and the frequency of the output signal is increased or the signal delay times of the signal generators 41, 42, 43 and 44 in the four separate lines have a variation, particularly, at least the chronological order of the level change points of the output signals in the array A and those of the output signals in the array C and the chronological order of the level change points of the output signals in the array B and the level change points of the output signals in the array D are maintained to be the same as those in the case where the frequency is low. It is possible to guarantee a correspondence relationship among the level change points in the first exclusive-OR signal and the second exclusive-OR signal; the photo detector changing the output level thereof; and a chronological order between the level change points. The control board 6 can recognize and control the position and the speed in at least a resolution which is four times as high as that in the conventional encoder based on the number of the level change points of the two exclusive-OR signals.

In the embodiment, moreover, the encoder 5 and the control board 6 are connected to each other through the four signal lines 71, 72, 73 and 74. By providing the four output terminals 61, 62, 63 and 64 of the encoder 5 and connecting the encoder 5 to the control board 6 through the four signal lines 71, 72, 73 and 74, thus, it is possible to produce the following advantages. More specifically, an analog type encoder which has conventionally been present outputs one waveform signal. The four signal lines 71, 72, 73 and 74 can be connected to the control board 6. Therefore, four analog type encoders can be connected to the control board 6 in place of the single encoder 5 of this embodiment. By disposing the four analog type encoders in a predetermined positional relationship with respect to the scale 4, it is possible to input, to the control board 6, four output signals having the same phase relationship as that of the encoder 5. It is possible to substitute the conventional analog type encoder for the encoder 5.

In this embodiment, since a plurality of first photo detectors 31a each of which outputs a level signal corresponding to each amount of the received light are connected to the first amplifier 51, in the case where a part of the first photo detectors 31a has a failure and the first amplifier 51 cannot output a level signal having a proper amplitude as indicated by a dashed line of FIG. 6A, the first amplifier 51 amplifies the level signals of the other first photo detectors 31a. Thus, the first differential signal generator 55 can output a first differential signal having the same quality as that obtained when the failure is not caused.

While the embodiment is an example of preferred embodiments according to the invention, the invention is not restricted thereto but various changes and modifications can be made without departing from the scope of the invention.

In this embodiment, the encoder 5 is a rotary encoder for detecting a light transmitted through the slits 11 formed along the outer periphery of the scale 4 taking the shape of the disc. However, the encoder 5 may be an encoder for detecting a light reflected by the marks formed along the outer periphery of the scale 4 taking the shape of the disc, for example. Furthermore, the encoder 5 may be a so-called linear encoder for detecting the slits 11 or the marks arranged linearly, for example.

Figure 7:
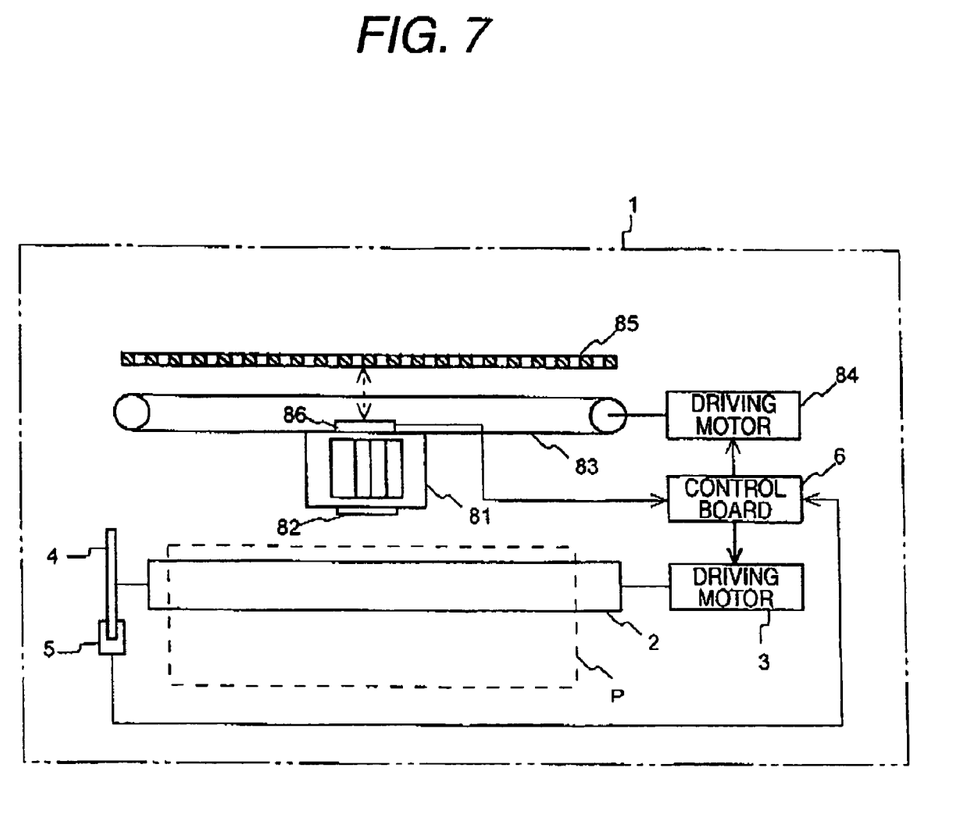
FIG. 7 is a view showing a variant of the printer according to the embodiment of the invention.

As shown in FIG. 7, the printer 1 may further comprises a carriage 81 provided with a plurality of ink tanks and an ink noble 82, a carriage driving mechanism 83 for holding the carriage 81 movably in a longitudinal direction of the medium transporting roller 2, a driving motor 84 for moving the carriage 81 in the longitudinal direction of the medium transporting roller 2, a plurality of marks 85 arranged linearly in the longitudinal direction of the medium transporting roller 2, and a linear encoder 86 disposed on the carriage 81 so as to oppose the marks 85.

In the linear encoder 86, a plurality of photo detectors are arranged on a board on which the light reflected by the mark 85 of the light of the photo emitter is irradiated in the same manner as shown in FIG. 4 and level signals of the photo detectors are integrated by the circuit shown in FIG. 5. In the same manner as the encoder 5, consequently, the linear encoder 86 can output a plurality of output signals having a resolution which is equal to or higher than the resolution of the mark 85. The linear encoder 86 can output a plurality of output signals having a high resolution while maintaining the level change points to have a desirable chronological order.

In the embodiment, the encoder 5 generates one output signal from the level signals of the four ($=2^2$) photo detectors 31a, 31b, 31c and 31d. In addition, for example, the encoder 5 may generate one output signal from level signals of $2^{n+1}$ (n is an integer of 1 or more) sets of photo detectors 31, for example. In this case, a frequency of the output signal is $2^n$ times as high as a frequency of the level signal of the photo detector 31. At this time, it is preferable that the photo detectors 31 in the array A and the photo detectors 31 in the array C should be disposed in the amount of a shift which is one-$2^{n+3}$th of one spatial cycle in the board 23, for example. Moreover, it is preferable that the photo detectors 31 in the array B and the photo detectors 31 in the array D should be disposed in the amount of a shift which is one-$2^{n+3}$th of one spatial cycle in the board 23.

In the above embodiment, the four photo detectors 31a, 31b, 31c and 31d in each array are arranged within a range corresponding to one spatial cycle SC. However, the four photo detectors 31a, 31b, 31c and 31d may be disposed within a larger range than one spatial cycle SC. In this case, it is preferable that the second photo detector 31b, the third photo detector 31c and the fourth photo detector 31d should be disposed in positions obtained by adding a distance which is an integral multiple of one spatial cycle SC to the respective positions within a range corresponding to one spatial cycle SC.

In the above embodiment, the signal generators 41, 42, 43 and 44 in the four separate lines output signals to be changed in a duty of approximately 50%. However, the signal generators 41, 42, 43 and 44 in the four separate lines may output signals to be changed in a duty which is not 50%, for example. In this case, for example, it is preferable that the four photo detectors 31a, 31b, 31c and 31d should be disposed at an interval of an amount of a shift which excludes an amount obtained by dividing one spatial cycle SC into four equal parts, and furthermore, an interval obtained by adding an amount of a shift which is an integral multiple of one spatial cycle SC to the amount of the shift.

In the embodiment, the description has been given to the driving device by taking the printer as an example. In addition, the apparatus having the medium feeding mechanism includes a printer compound machine, a scanner, an ADF (Auto Document Feeder) apparatus, a copy machine and a facsimile apparatus, for example. Moreover, some of these apparatuses to drive a reading unit, an ink carriage and a photosensitive drum. Furthermore, an apparatus having a driving mechanism includes a machine tool such as an NC (Numerical Control) and an automated apparatus.

What is claimed is:

1. An encoder, adapted to be opposed to a scale provided with a plurality of marks or slits arranged in a first direction such that a distance between centers of adjacent marks or slits in the first direction assumes a first length, comprising:
    a photo emitter, operable to emit light;
    a plurality of photo detectors, each of which has a light receiving region adapted to receive the light emitted from the photo emitter and transmitted by way of the marks or slits, and is operable to output a detection signal in accordance with a quantity of the light received by the light receiving region, the photo detectors including a first photo detector, a second photo detector, a third photo detector and a fourth photo detector which are arranged in a second direction perpendicular to the first direction while being shifted in the first direction by a second length which is $[m+(1/2^{n+3})]$ of the first length;
    a first signal generator, operable to generate a first signal based on at least the detection signal output from the first photo detector;
    a second signal generator, operable to generate a second signal based on at least the detection signal output from the second photo detector;
    a third signal generator, operable to generate a third signal based on at least the detection signal output from the third photo detector;
    a fourth signal generator, operable to generate a fourth signal based on at least the detection signal output from the fourth photo detector;
    a first exclusive-OR logic circuit, operable to perform a logical exclusive-OR calculation with respect to the first signal and the third signal to generate a first exclusive-OR signal;
    a second exclusive-OR logic circuit, operable to perform a logical exclusive-OR calculation with respect to the second signal and the fourth signal to generate a second exclusive-OR signal;
    a first output terminal, adapted to output one of the first signal, the second signal, a third signal and the fourth signal;
    a second output terminal, adapted to output another one of the first signal, the second signal, a third signal and the fourth signal;
    a third output terminal, adapted to output the first exclusive-OR signal; and
    a fourth output terminal, adapted to output the second exclusive-OR signal, wherein:
    m is an integer no less than zero;
    n is an integer no less than one;
    the level of the detection signal is changed in accordance with a relative movement between the marks or slits and the photo detectors, so as to have a first frequency; and
    each of the first signal, the second signal, the third signal and the fourth signal has a second frequency which is $2^n$-times of the first frequency.

2. The encoder as set forth in claim 1, wherein:
    each of the photo detectors comprises at least one light receiving unit including four light receiving elements each of which has the light receiving region;
    the light receiving elements are arranged in the first direction such that a distance between centers of adjacent light receiving regions assumes a third length which is one-fourth of the first length; and
    each of the first signal generator, the second signal generator, the third signal generator, the fourth signal generator comprises:
    a first circuit, operable to generate a first differential signal in accordance with a difference between a first pair of the four light receiving elements in which a distance between centers of the light receiving regions thereof assumes a fourth length which is a half of the first length;
    a second circuit, operable to generate a second differential signal in accordance with a difference between a second pair of the four light receiving elements in which a distance between centers of the light receiving regions thereof assumes the fourth length; and
    a third exclusive-OR logic circuit, operable to perform a logical exclusive-OR calculation with respect to the first differential signal and the second differential signal to generate one of the first signal, the second signal, the third signal and the fourth signal.

3. A driving device, operable to move an object, comprising:
    a scale provided with a plurality of marks or slits arranged in a first direction such that a distance between centers of adjacent marks or slits in the first direction assumes a first length;
    an encoder, opposing the scale and comprising:
    a photo emitter, operable to emit light;
    a plurality of photo detectors, each of which has a light receiving region adapted to receive the light emitted from the photo emitter and transmitted by way of the marks or slits, and is operable to output a detection signal in accordance with a quantity of the light received by the light receiving region, the photo detectors including a first photo detector, a second photo detector, a third photo detector and a fourth photo detector which are arranged in a second direction perpendicular to the first direction while being shifted in the first direction by a second length which is $[m+(1/2^{n+3})]$ of the first length;
    a first signal generator, operable to generate a first signal based on at least the detection signal output from the first photo detector;

a second signal generator, operable to generate a second signal based on at least the detection signal output from the second photo detector;
a third signal generator, operable to generate a third signal based on at least the detection signal output from the third photo detector;
a fourth signal generator, operable to generate a fourth signal based on at least the detection signal output from the fourth photo detector;
a first exclusive-OR logic circuit, operable to perform a logical exclusive-OR calculation with respect to the first signal and the third signal to generate a first exclusive-OR signal;
a second exclusive-OR logic circuit, operable to perform a logical exclusive-OR calculation with respect to the second signal and the fourth signal to generate a second exclusive-OR signal;
a first output terminal, adapted to output one of the first signal, the second signal, a third signal and the fourth signal;
a second output terminal, adapted to output another one of the first signal, the second signal, a third signal and the fourth signal;
a third output terminal, adapted to output the first exclusive-OR signal; and
a fourth output terminal, adapted to output the second exclusive-OR signal, wherein:
m is an integer no less than zero;
n is an integer no less than one;
the level of the detection signal is changed in accordance with a relative movement between the marks or slits and the photo detectors, so as to have a first frequency; and
each of the first signal, the second signal, the third signal and the fourth signal has a second frequency which is $2^n$-times of the first frequency.

4. An encoder, adapted to be opposed to a scale provided with a plurality of marks or slits arranged in a first direction such that a distance between centers of adjacent marks or slits in the first direction assumes a first length, comprising:
a photo emitter, operable to emit light;
a plurality of photo detectors, each of which has a light receiving region adapted to receive the light emitted from the photo emitter and transmitted by way of the marks or slits, and is operable to output a detection signal in accordance with a quantity of the light received by the light receiving region, the photo detectors including a first photo detector, a second photo detector, a third photo detector and a fourth photo detector which are arranged in a second direction perpendicular to the first direction while being shifted in the first direction;
a first signal generator, operable to generate a first signal based on at least the detection signal output from the first photo detector;
a second signal generator, operable to generate a second signal based on at least the detection signal output from the second photo detector;
a third signal generator, operable to generate a third signal based on at least the detection signal output from the third photo detector;
a fourth signal generator, operable to generate a fourth signal based on at least the detection signal output from the fourth photo detector;
a first exclusive-OR logic circuit, operable to perform a logical exclusive-OR calculation with respect to the first signal and the third signal to generate a first exclusive-OR signal;
a second exclusive-OR logic circuit, operable to perform a logical exclusive-OR calculation with respect to the second signal and the fourth signal to generate a second exclusive-OR signal;
a first output terminal, adapted to output one of the first signal, the second signal, a third signal and the fourth signal;
a second output terminal, adapted to output another one of the first signal, the second signal, a third signal and the fourth signal;
a third output terminal, adapted to output the first exclusive-OR signal; and
a fourth output terminal, adapted to output the second exclusive-OR signal, wherein:
m is an integer no less than zero;
the level of the detection signal is changed in accordance with a relative movement between the marks or slits and the photo detectors, so as to have a first frequency; and
each of the first signal, the second signal, the third signal and the fourth signal has a second frequency which is double of the first frequency.

5. The encoder as set forth in claim 4, wherein:
each of the photo detectors comprises at least one light receiving unit including four light receiving elements each of which has the light receiving region;
the light receiving elements are arranged in the first direction such that a distance between centers of adjacent light receiving regions assumes a second length which is one-fourth of the first length; and
each of the first signal generator, the second signal generator, the third signal generator, the fourth signal generator comprises:
a first circuit, operable to generate a first differential signal in accordance with a difference between a first pair of the four light receiving elements in which a distance between centers of the light receiving regions thereof assumes a third length which is a half of the first length;
a second circuit, operable to generate a second differential signal in accordance with a difference between a second pair of the four light receiving elements in which a distance between centers of the light receiving regions thereof assumes the fourth length; and
a third exclusive-OR logic circuit, operable to perform a logical exclusive-OR calculation with respect to the first differential signal and the second differential signal to generate one of the first signal, the second signal, the third signal and the fourth signal.

6. A driving device, operable to move an object comprising:
a scale provided with a plurality of marks or slits arranged in a first direction such that a distance between centers of adjacent marks or slits in the first direction assumes a first length;
an encoder, opposing the scale and comprising:
a photo emitter, operable to emit light;
a plurality of photo detectors, each of which has a light receiving region adapted to receive the light emitted from the photo emitter and transmitted by way of the marks or slits, and is operable to output a detection signal in accordance with a quantity of the light received by the light receiving region, the photo detectors including a first photo detector, a second photo detector, a third photo detector and a fourth photo detector which are arranged in a second direction perpendicular to the first direction while being shifted in the first direction;

a first signal generator, operable to generate a first signal based on at least the detection signal output from the first photo detector;

a second signal generator, operable to generate a second signal based on at least the detection signal output from the second photo detector;

a third signal generator, operable to generate a third signal based on at least the detection signal output from the third photo detector;

a fourth signal generator, operable to generate a fourth signal based on at least the detection signal output from the fourth photo detector;

a first exclusive-OR logic circuit, operable to perform a logical exclusive-OR calculation with respect to the first signal and the third signal to generate a first exclusive-OR signal;

a second exclusive-OR logic circuit, operable to perform a logical exclusive-OR calculation with respect to the second signal and the fourth signal to generate a second exclusive-OR signal;

a first output terminal, adapted to output one of the first signal, the second signal, a third signal and the fourth signal;

a second output terminal, adapted to output another one of the first signal, the second signal, a third signal and the fourth signal;

a third output terminal, adapted to output the first exclusive-OR signal; and a fourth output terminal, adapted to output the second exclusive-OR signal, wherein:

m is an integer no less than zero;

the level of the detection signal is changed in accordance with a relative movement between the marks or slits and the photo detectors, so as to have a first frequency; and each of the first signal, the second signal, the third signal and the fourth signal has a second frequency which is double of the first frequency.

* * * * *